US010750390B2

(12) United States Patent
Kim et al.

(10) Patent No.: US 10,750,390 B2
(45) Date of Patent: Aug. 18, 2020

(54) MDT INFORMATION-REPORTING FORMAT IN A WIRELESS COMMUNICATION SYSTEM, AND TIME-STAMP CONFIGURING METHOD AND APPARATUS

(71) Applicant: Samsung Electronics Co., Ltd., Suwon-si, Gyeonggi-do (KR)

(72) Inventors: Sang Bum Kim, Seoul (KR); Soeng Hun Kim, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/601,582

(22) Filed: Jan. 21, 2015

(65) Prior Publication Data

US 2015/0139017 A1 May 21, 2015

Related U.S. Application Data

(63) Continuation of application No. 13/817,780, filed as application No. PCT/KR2011/005814 on Aug. 10, 2011, now Pat. No. 9,185,592.

(30) Foreign Application Priority Data

Aug. 16, 2010 (KR) ........................ 10-2010-0078598

(51) Int. Cl.
*H04J 1/16* (2006.01)
*H04W 24/10* (2009.01)
(Continued)

(52) U.S. Cl.
CPC ........... *H04W 24/10* (2013.01); *H04L 43/067* (2013.01); *H04W 16/18* (2013.01)

(58) Field of Classification Search
None
See application file for complete search history.

(56) References Cited

U.S. PATENT DOCUMENTS

2005/0102099 A1 5/2005 Linn
2007/0002086 A1 1/2007 Jung et al.
(Continued)

FOREIGN PATENT DOCUMENTS

CN 101026504 A 8/2007
EP 2 360 962 A2 8/2011
(Continued)

OTHER PUBLICATIONS

3rd Generation Partnership Project; Technical Specification Group TSG RAN Universal Terrestrial Radio Access (UTRA) and Evolved Universal Terrestrial Radio Access (E-UTRA); Radio Measurement Collection for Minimization of Drive Tests (MDT); Overall Description; Stage 2 (Release 10), 3GPP TS 37.320, Jun. 2010, V0.7.0, 3GPP, Valbonne, France.

(Continued)

*Primary Examiner* — Ayaz R Sheikh
*Assistant Examiner* — Sori A Aga
(74) *Attorney, Agent, or Firm* — Jefferson IP Law, LLP

(57) ABSTRACT

A method for configuring a Minimization of Drive Test (MDT) information reporting format and a time-stamp is provided that supports MDT in a 3$^{rd}$ Generation Partnership Project (3GPP) system. The method defines a reporting format needed in a process where UE transmits MDT measurements to a serving base station, and sets the number of bits required to log time stamp and the unit of logging time.

10 Claims, 11 Drawing Sheets

(51) Int. Cl.
*H04W 16/18* (2009.01)
*H04L 12/26* (2006.01)

(56) References Cited

U.S. PATENT DOCUMENTS

| | | | |
|---|---|---|---|
| 2007/0002806 A1 | 1/2007 | Soomro | |
| 2008/0014958 A1* | 1/2008 | Kim | H04W 36/0088 455/452.2 |
| 2008/0159456 A1* | 7/2008 | Irie | H04W 56/0085 375/354 |
| 2011/0201279 A1* | 8/2011 | Suzuki | H04W 24/10 455/67.11 |
| 2011/0250910 A1* | 10/2011 | Lee | H04W 24/10 455/466 |
| 2012/0092998 A1* | 4/2012 | Chang | H04W 24/10 370/241 |
| 2012/0315890 A1 | 12/2012 | Suzuki et al. | |
| 2013/0122891 A1* | 5/2013 | Palm | H04W 24/10 455/422.1 |
| 2014/0133463 A1 | 5/2014 | Jung et al. | |

FOREIGN PATENT DOCUMENTS

| | | |
|---|---|---|
| JP | 5-252192 A | 9/1993 |
| JP | 2005-140775 A | 6/2005 |
| JP | 2007-158529 A | 6/2007 |
| JP | 2009-55462 A | 3/2009 |
| KR | 10-2008-0066561 A | 7/2008 |
| KR | 10-2008-0111378 A | 12/2008 |
| KR | 10-2010-0082369 A | 7/2010 |
| WO | 2007/095801 A1 | 8/2007 |
| WO | 2009/112070 A1 | 9/2009 |
| WO | 2010/087625 A2 | 8/2010 |

OTHER PUBLICATIONS

3rd Generation Partnership Project (3GPP) Technical Specification Group Radio Access Network (TSG RAN), Radio Measurement Collection for Minimization of Drive Tests (MDT), Overall Description, Stage 2 (Release 10), Jun. 30, 2010, pp. 1-13, 3GPP TS 37.320 V0.6.2, Section 5.1, 3GPP, Sophia Antipolis, Valbonne, France.

3rd Generation Partnership Project (3GPP) Technical Specification Group Radio Access Network (TSG RAN), Study on Minimization of Drive-tests in Next Generation Networks (Release 9), Dec. 31, 2009, 3GPP TR 36.805 V2.0.0, Sections 6.1.1 and 6.1.2, 3GPP, Sophia Antipolis, Valbonne, France.

TD Tech, Time stamp achievement and reporting in MDT, 3GPP TSG-RAN WG2 Meeting #70, R2-102909, May 4, 2010, Montreal, Canada, http://www.3gpp.org/ftp/tsg_ran/WG2_RL2/TSGR2_70/Docs.

Nokia Siemens Networks, Logged MDT principles, 3GPP Draft, R2-103191, May 4, 2010, Montreal, Canada.

\* cited by examiner

MDT INFORMATION-REPORTING FORMAT IN A WIRELESS COMMUNICATION SYSTEM, AND TIME-STAMP CONFIGURING METHOD AND APPARATUS

CROSS-REFERENCE TO RELATED APPLICATION(S)

This application is a continuation application of a prior application Ser. No. 13/817,780, filed on Feb. 19, 2013, which was a U.S. National Stage application under 35 U.S.C. § 371 of an International application filed on Aug. 10, 2011 and assigned application number PCT/KR2011/005814, which claimed the benefit under 35 U.S.C § 119(a) of a Korean patent application filed on Aug. 16, 2010 in the Korean Intellectual Property Office and assigned Serial number 10-2010-0078598, the entire disclosure of each of which is hereby incorporated by reference.

BACKGROUND OF THE INVENTION

1. Field of the Invention

This invention relates to a Minimization of Drive Test (MDT) information reporting format and a time stamp configuring method to support a MDT function in wireless communication systems, or 3rd Generation Partnership Project (3GPP) systems.

The method defines a reporting format needed in a process where user equipment (UE) transmits MDT measurements to a serving base station, and sets the number of bits required to log time stamp and the unit of logging time.

2. Description of the Related Art

Mobile communication systems have been developed to provide communication services to users while they are moving. With the rapid development of communication technology, mobile communication systems have provided rapid data communication services as well as voice communication services. The specification for Long Term Evolution-Advanced (LTE-A), one of the next generation mobile communication systems, is being standardized by the 3GPP. The standardization for LTE-A is proceeding to be completed by the latter half of 2010. LTE-A refers to a technology that can provide packet-based communication with a higher transmission rate than the current data transmission rate.

As the 3GPP standardization is evolved, convenient optimizations for wireless networks are being discussed other than increases in communication service speed. When establishing wireless networks at the initial stage or optimizing networks, base stations or base station controllers must collect wireless environment information for their cell coverage, which is called a 'drive test'. Conventional drive tests are executed in such a way that engineers load measurement devices on a vehicle and repeatedly perform a measurement task for a relatively long period of time, which is complicated. The measurement results are processed in analysis processes and they are used to set system parameters of each of base stations or base station controllers. Conventional drive tests increase in wireless optimization cost and management cost and consume significant time. Therefore, in order to minimize drive tests and to improve analysis processes for wireless environments and manual setting processes, a study called 'Minimization of Drive Test (MDT)' is made. To this end, instead of performing Drive Test, UE measures a channel quality and transmits measurements regarding a corresponding wireless channel to a base station periodically or immediately when an event occurs. Alternatively, after a certain period of time has elapsed from the storage of wireless channel measurements, UE may transmit measurements regarding a corresponding wireless channel to a base station. In the following description, the transmission of wireless channel measurements measured by UE and additional information to a base station is called an MDT measurements reporting operation. In this environment, if UE is capable of communicating with a base station, it can immediately transmit the channel quality measurement result to the base station. On the contrary, if UE isn't capable of performing an immediate report, it logs MDT measurements and then reports, when it can communicate with the base station, the information to the base station. The base station uses the received MDT measurements to optimize cell coverage. LTE-A classifies types of MDT measurements reporting, according to UE RRC states, as the following table 1.

TABLE 1

| UE RRC state | MDT measurements reporting by UE |
|---|---|
| Idle mode | Logging and deferred reporting |
| Connected mode | Immediate reporting |

As described in table 1, 'idle mode' refers to a state where UE is not communicating with a base station, and 'connected mode' refers to a state where UE is communicating with a base station. While MDT is performed, channel quality information measured by UE can be transmitted via RRC signaling. Therefore, although UE operates in an idle mode, it can switch the idle mode to a connected mode in order to transmit corresponding information. In that case, UE logs channel measurements and defers the transmission to a base station until its idle mode is switched to a connected mode.

MDT measurements are transmitted to the base station by the use of control plane protocol stacks for processing RRC and NAS signals.

FIG. 1 illustrates a general control plane protocol stack of an LTE system. RRC layers 105 and 155 perform system information transmission, RRC link control, channel measurement control, etc. PDCP 110 and 150 compress/decompress IP header. RLC 115 and 145 reconfigure PDCP PDU in proper size and perform an ARQ operation. MAC 120 and 140 connect to a number of RLC devices configured in one user equipment. MAC 120 and 140 multiplex RLC PUDs to MAC PDU, and de-multiplex RLC PDUs from MAC PDU. The protocol layer devices include proper headers at need. For example, RLC device adds an RLC header including a serial number, etc., to RLC SDU. MAC device adds an MAC header including an RLC device identifier, etc., to MAC SDU. Physical layers (PHY) 125 and 135 in UE and ENB channel-code and modulate MAC PDU, create OFDM symbols, and transmit them via a wireless channel 130. PHY 125 and 135 demodulate and channel-decode OFDM symbols received via a wireless channel 130, and transfer them to the upper layers. PHY 125 and 135 also perform Hybrid Automatic Retransmission request (HARQ) for MAC PDU. HARQ performs retransmission on PHY layer and is a soft combination of a retransmitted packet and the original packet.

As shown in FIG. 2, MDT measurements logged by UE is transferred from RRC layer to PDCP layer via Signaling Radio Bearer 2 (SRB2). RRC control message or NAS message 210 is transferred from RRC layer 205 to PDCP layer 230 via SRB0 (215), SRB1 (220) or SRB2 (225).

SRB0 is used to transfer RRC message via CCCH. SRB0 has the highest priority order. SRB1 is used to transfer RRC message via DCCH, and also NAS message part of which is transferred in piggyback format. SRB2 is used to transfer NAS message via DCCH. The packets transferred by SRB1 and SRB2 are all encoded via integrity and ciphering processes. SRB1 has a higher priority order than SRB2. MDT measurements are transferred via SRB2 with the lowest priority order. User plane data can be also transferred via Data Radio Bearer (DRB) 250 other than SRB0~SRB2. Packets transferred via DRB are processed by a ciphering and ROHC process 255 and transferred to RLC layer 265. RLC layer maps corresponding packets to DTCH.

UE operating in idle mode logs MDT measurements periodically or when the measured information meets a specific event. An example of an event for logging MDT measurements is as follows.

(1) Periodical downlink pilot measurements
(2) Serving Cell becomes worse than threshold
(3) Transmit power headroom becomes less than threshold Logged MDT Measurements:
(1) Global cell ID of a serving cell
(2) Measurements regarding Reference Signal Received Power (RSRP) and Reference Signal Received Quality (RSRQ) of a serving cell
(3) Location information
(4) Time stamp MDT measurements need to include information to identify a serving cell, i.e., global cell ID. This tells which cell corresponding information is acquired. A global cell ID must uniquely indicate one cell. A wireless channel state of a serving cell can be expressed via a specific measurement. The states of EUTRA can be expressed via RSRP and RSRQ, UTRAN via RSCP and Ec/No, and GERAN via Rxlev. The embodiments of the invention are described based on EUTRA LTE systems; however, it should be understood that the invention can also be applied to the other systems. In 3GPP, the MDT function will be applied to LTE and UMTS.

Location information from among MDT measurements transmitted to a base station serves as an important component. If UE can't acquire the GPS-based location information, it measures a set of Reference Signal Received Power from the adjacent base stations and informs the base station of it. The set of Reference Signal Received Power is called a RF fingerprint. Since the base station receiving the RF fingerprint has known the location information regarding the adjacent base stations, it applies the signal power values of the adjacent base stations to a signal path attenuation model and thus predicts the distances between the UE and the respective, adjacent base stations. If the location information regarding the adjacent base stations and the predicted distances between the UE and the adjacent base stations are applied to a technique, such as a triangulation, an approximate location of the UE can be acquired. If UE isn't capable of acquiring the GPS-based location information, it can acquire information regarding a predicted location instead of an accurate location and transmit it to the base station.

Time stamp is also important to acquire MDT measurements. When wireless channel measurement is performed, time stamp serves to optimize service coverage. This is because wireless channel states vary according to hours. Time stamp is more importantly used in a logging and deferred reporting operation in an idle mode than an immediate reporting operation in a connected mode. Since an immediate report in a connected mode is going to include a result measured immediately before the reporting operation, time stamp isn't important in the immediate reporting operation in a connected mode. However, if a logging and deferred reporting operation in an idle mode doesn't use time stamp, it can't be predicted when the measurement was performed. Therefore, the currently developed 3GPP standard doesn't have time stamp for an immediate reporting operation in a connected mode; however, it includes time stamp as necessary information in a logging and deferred reporting operation in an idle mode.

Time stamp can be provided in various types. Types of time stamps refer to an absolute time or a relative time that UE can provide. An absolute time needs a number of bits to report a corresponding time stamp. On the contrary, a relative time may need a relatively small number of bits than the absolute time.

In the 3GPP standard, relative time stamp is included in MDT measurements in order to reduce signalling overhead. When base stations provide reference information regarding absolute times to UEs, the UEs include relative time stamps in respective measurement samples, based on the received absolute times. After completing MDT measurement, UE reports the logged measurements to a base station and also informs the base station of the absolute time reference information that it has received from the base station. This is because a base station that provided absolute time reference information to UE at the initial stage may differ from a base station that the UE intends to make a report to.

FIG. 3 illustrates a flow chart describing a method for performing MDT measurement in a logging and deferred reporting operation in an idle mode. eNB 305 configures MDT measurement and transmits corresponding information, i.e., MDT measurement configuration information to UE 300 in a connected mode (310). The MDT measurement configuration information includes absolute time reference information, sampling cycle, measurement duration, etc. The absolute time reference information has been already described above. The sampling cycle is used for periodical downlink pilot measurements, and also used to measure wireless channels at each cycle. The measurement duration refers to the total period of time in performing MDT. UE performs MDT until a corresponding measurement duration has elapsed.

If the RRC connected state of UE 300 with the eNB 305 is switched from a connected mode to an idle mode, the UE 300 starts to perform MDT measurement (315). UE 300 measures and logs MDT (320), and then continues measuring and logging MDT at the sampling cycle that was received (325). MDT measurements are logged at each measurement cycle (330).

If UE 300 enters a connected mode (335), it informs the eNB 305 as to whether it has logged MDT measurements (340). eNB 305 may request a report from the UE 300 according to a corresponding state. If UE 300 receives the request from eNB 305, it reports the MDT measurements that it has logged by the time to the eNB 305, and then removes it. On the contrary, if UE 300 doesn't receive the request from eNB 305, it retains the logged information. If UE 300 enters an idle mode but the measurement duration hasn't elapsed (345), it continues to perform MDT measurement and acquires the MDT measurements (350). Measurement duration may or may not take a period of time in a connected mode into account. If the measurement duration has elapsed (355), UE 300 stops MDT measurement.

UE 300 enters a connected mode (360). UE 300 informs the eNB 305 that there is a newly logged MDT measurement, and reports, if the request is made from the eNB 305, it to the eNB 305 (365).

However, in order to efficiently transmit MD measurements from UE to eNB, the MDT information reporting format to the eNB and the time stamp configuration must be defined.

SUMMARY OF THE INVENTION

The invention has been made in view of the above problems, and provides a method and system for configuring a Minimization of Drive Test (MDT) information reporting format and a time-stamp that supports MDT in a mobile communication system.

The invention further provides a method and system that defines a reporting format needed in a process where UE transmits MDT measurements to a serving base station, and sets the number of bits required to log time stamp and the unit of logging time.

In accordance with an exemplary embodiment of the invention, the invention provides a method for transmitting channel measurements from UE to an eNB in a wireless communication system, including: receiving channel measurement setting information from the eNB; measuring wireless channel information at cycles included in the channel measurement setting information; logging the measured wireless channel information using a preset time stamp; and transmitting the logged wireless channel information to the eNB.

In accordance with another exemplary embodiment of the invention, the invention provides User Equipment (UE) that measures wireless channel information and transmits it to an eNB in a wireless communication system, including: a transceiver for receiving channel measurement setting information from the eNB and transmitting created channel measurements to the eNB; and a controller for: measuring wireless channel information at cycles included in the channel measurement setting information; logging the measured wireless channel information using a preset time stamp; and transmitting the logged wireless channel information to the eNB.

Preferably, the time stamp has fixed values. The time stamp is stored in a bit field, and the size of bit field is fixed.

BRIEF DESCRIPTION OF THE DRAWINGS

The features and advantages of the invention will become more apparent from the following detailed description viewed in conjunction with the accompanying drawings, in which.

DETAILED DESCRIPTION OF EXEMPLARY EMBODIMENTS

The invention relates to a Minimization of Drive Test (MDT) information reporting format and a time-stamp configuring method to support a MDT function in $3^{rd}$ Generation Partnership Project (3 GPP) systems.

The method defines a reporting format needed in a process where user equipment (UE) transmits MDT measurements to a serving base station, and sets the number of bits required to log time stamp and the unit of logging time.

Figure 1:
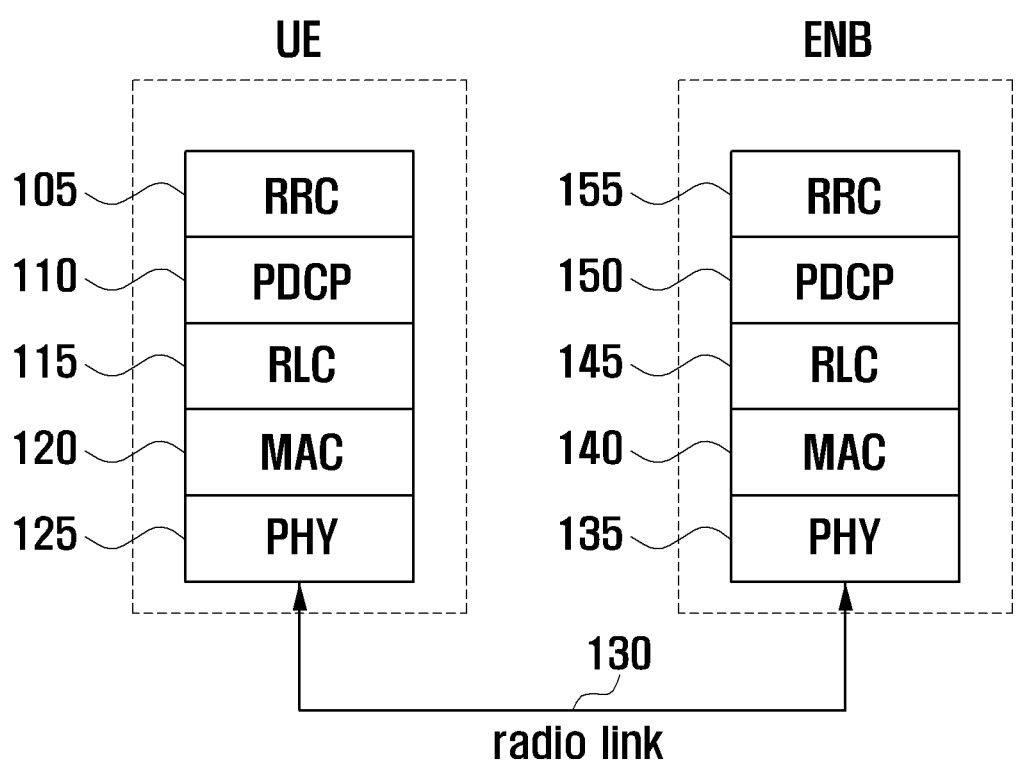
FIG. 1 illustrates a general control plane protocol stack of an LTE system.
Figure 2:
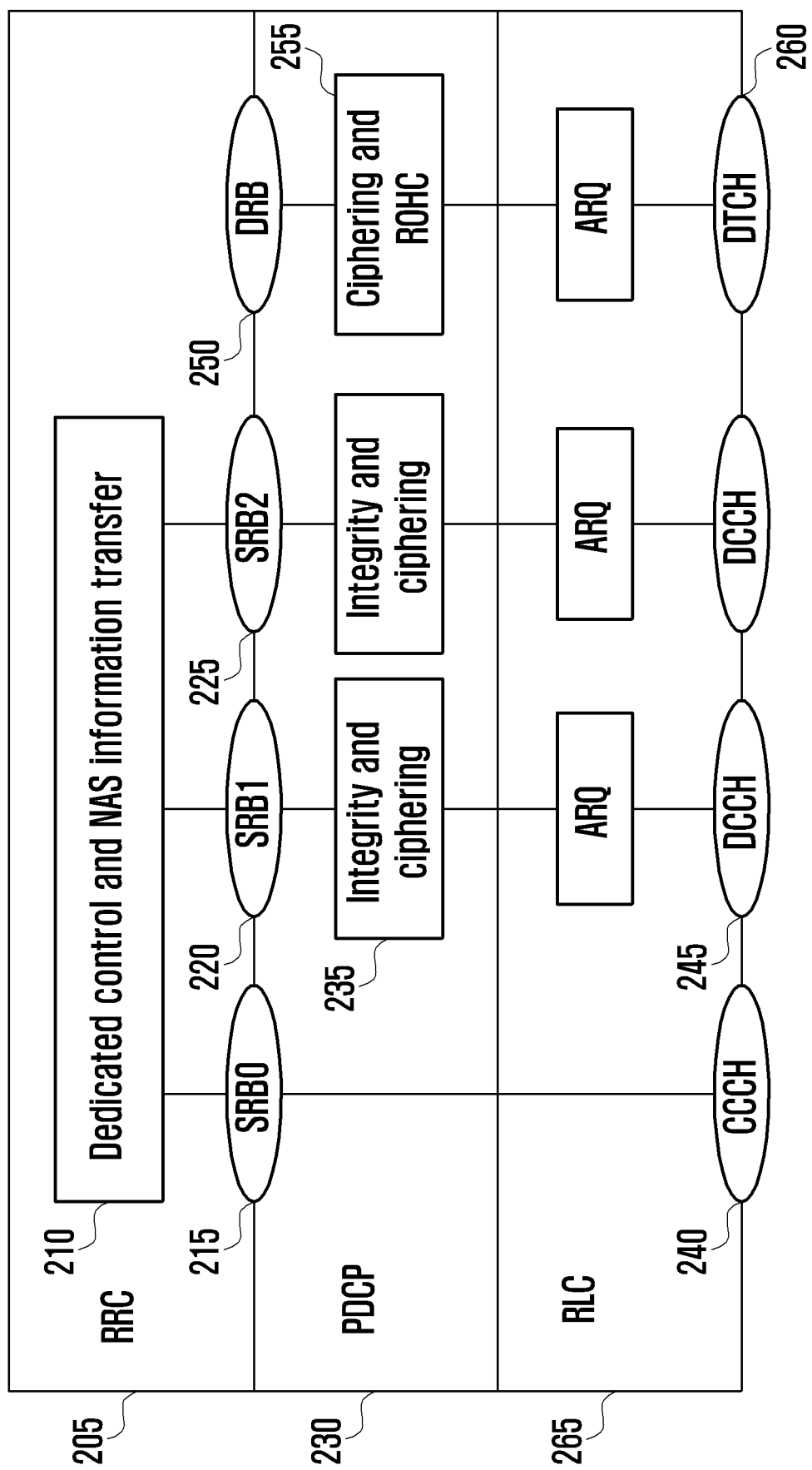
FIG. 2 illustrates a view showing an SRB mapping relation in an LTE system.
Figure 3:
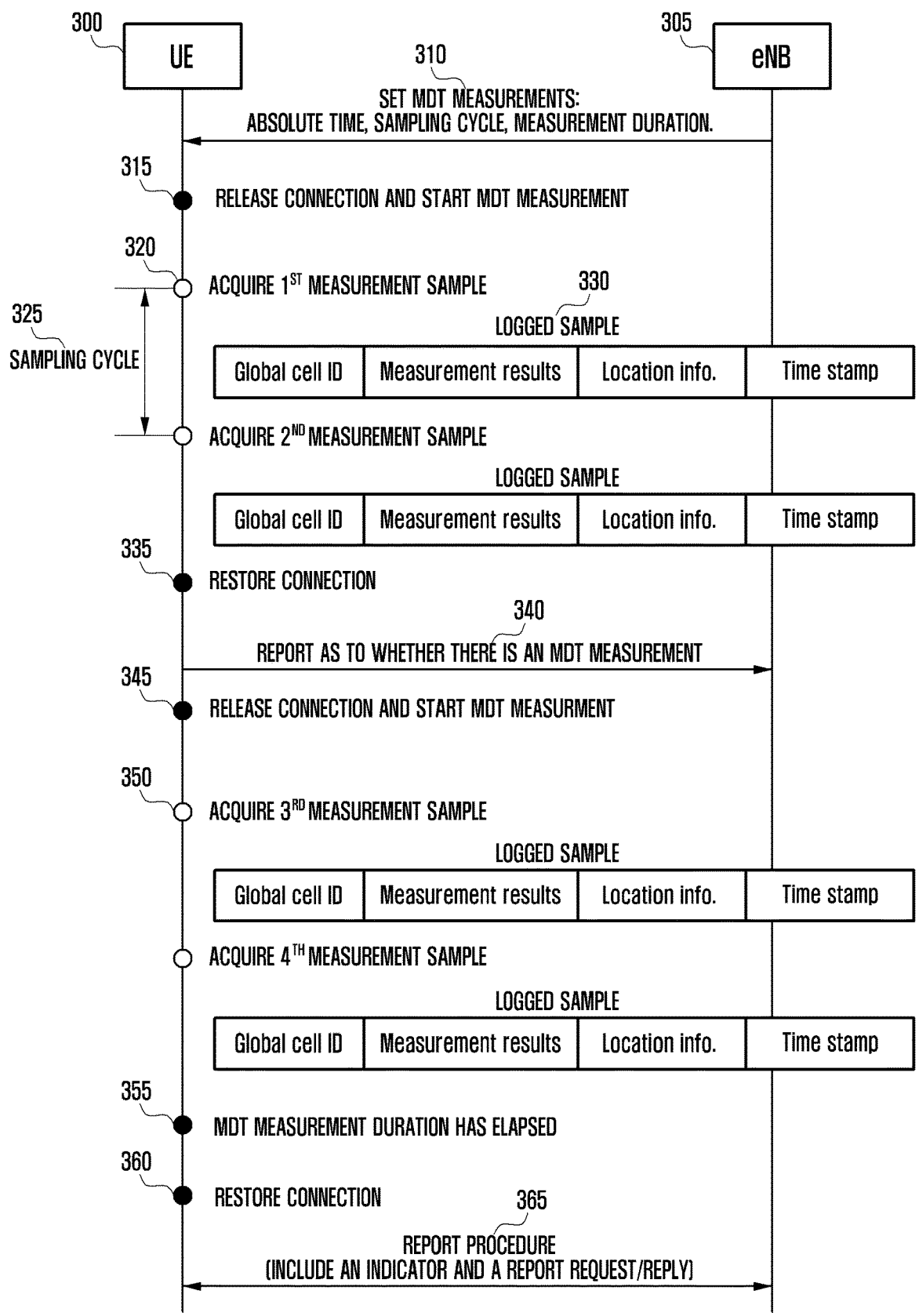
FIG. 3 illustrates a flow chart describing a method for performing MDT measurement in a logging and deferred reporting operation in an idle mode.
Figure 4:
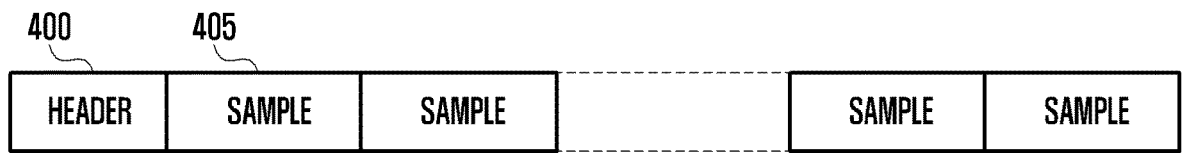
FIG. 4 illustrates a reporting format of logged MDT measurements.

FIG. 4 illustrates a reporting format of MDT measurements logged in UE. The reporting format includes a header 400 and a set of MDT measurements 405 collected at a specific time.

The header 400 includes one or a number of pieces of information as follows.

Echoed absolute time: it refers to a reference time to use a relative time stamp and UE informs eNB of it when reporting MDT measurements to the eNB.

Sampling cycle: it is used for an event for logging MDT measurements periodically Measurement type: it is a field indicating a time for periodic MDT measurement or specific measurement Each sample in MDT measurements includes one or a number of pieces of information as follows.

IE indicators: they indicate whether respective configuration information items (i.e., relative time stamp, global cell ID, RSRP/RSRQ measurement, and location information) are in a sample global cell ID of a serving cell RSRP and RSRQ measurements of a serving cell relative time stamp location information As relative location information, a relative time stamp can be expressed via a unit of a specific period of time. For example, if Value 1, as a relative time stamp, is defined as 1.28 sec, a relative time can be expressed as multiples of 1.28 seconds. An MDT measurement device measures channel states according to an actual sampling cycle, and may log the measurement results by using the time stamp.

The unit of a relative time stamp may also be defined as a fixed time, and also defined considering the number of bits representing time information. For the two examples, the invention proposes a method for deriving the number of bits required to represent time information, a method for determining a span of time corresponding to one unit of a time stamp, and a method for operating UE.

Embodiment 1

In the embodiment, a span of time corresponding to one unit of time stamp (hereinafter called a 'time stamp unit') can be fixed, and a size of bit field for storing time information (hereinafter called a 'time information field') can also be fixed. For example, if a time stamp unit is 1.28 seconds (preferably, 1 second), the size of a time information field to express 3 hours, as a measurement duration, needs 13 bits. It is preferable that a time stamp unit is set to be identical to a sampling cycle. If one time stamp unit is set to 1.28 seconds and the size of a time information field is set to 13 bits, the design of the embodiment is simple but inefficient. This is because, if the measurement duration is less or greater than 3 hours, all the bits in the time information fields are not used. This may waste the time information fields or cause a state where a precise time cannot be informed. For example, if the measurement duration is 1.5 hours, the number of bits for actual time information may be approximately a half of 13 bits. On the contrary, if the measurement duration is 4 hours, the time information cannot be expressed by 13 bits. Since the actual measurement duration may be configured with a variety of values depending on situations, this can be specifically processed when time stamp value is recorded in the time information field. If one time stamp unit is set to 1.28 seconds and the time information field is set to 13 bits, the span of time expressed by 13 bits may be approximately 3 hours. If the measurement duration is less than 3 hours, the bits not used are processed as 'zero.' On the contrary, if the measurement duration is greater than 3 hours, the time information field can be processed by a variety of methods. A first method is to reset the time stamp to a value of time stamp 1 (i.e., the first time stamp value) if a time information field doesn't have any available bits to express a measurement duration. In that case, an eNB needs to perform a procedure that discerns between a sample having a value of time stamp 1 at the first stage and a sample that processes a value of current time stamp 1. Since samples will be recorded in order, samples that are earlier received or decoded are regarded as early recorded samples.

A second method is to re-use, if the measurement duration exceeds a range of time that can be expressed by a time information field, ignores the excess and reuses the final time stamp value. This is because the time information field cannot express a time greater than the range of time. Therefore, eNB must set the measurement duration at the initial stage by taking the condition into account.

Figure 5:
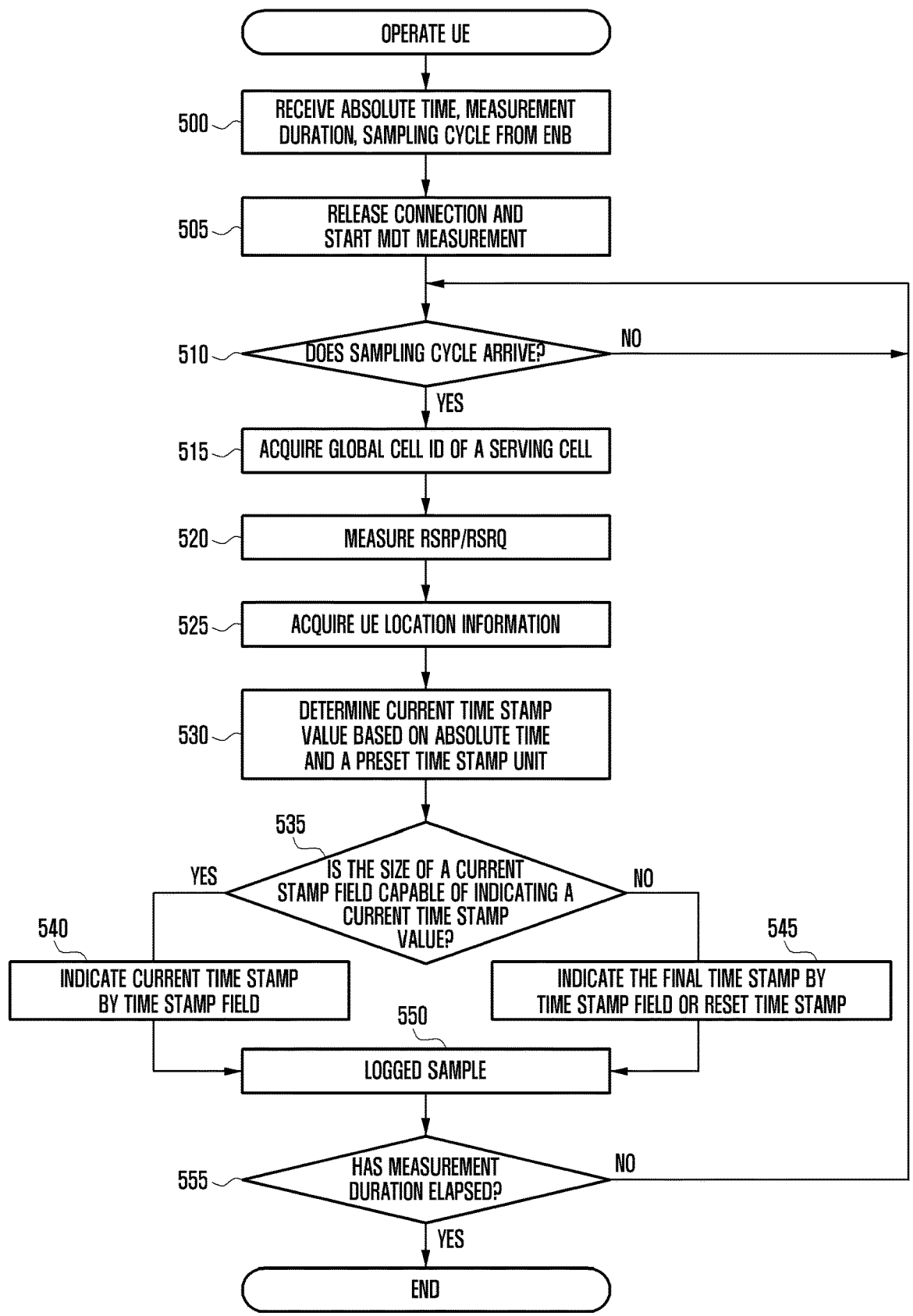
FIG. 5 illustrates a flow chart describing a method for operating UE in embodiment 1 of the invention.

FIG. 5 illustrates a flow chart describing a method for operating UE in embodiment 1 of the invention.

UE receives echoed absolute time, measurement duration, and sampling cycle from eNB via MDT configuration information (500). When UE switches the current mode to an idle mode, it performs MDT measurement (505). UE determines whether the sampling cycle arrives (510).

If a time point arrives to log the measurement result at step 510, UE collects information items to be logged in samples via the following steps 515 to 530. If the MDT measurements are logged according to a specific event, UE directly perform step 515 without performing step 510.

Steps 515 to 530 are described in detail as follows.

UE acquires identification information for identifying serving cells, i.e., a global cell ID (515). After that, UE measures a wireless channel state (520). In the embodiment of the invention, UE can measure RSRP and RSRQ. UE acquires the location information (525), and determines a current time stamp value based on a preset time stamp unit and the absolute time (530). UE determines whether the size of time information field can express the current time stamp information (535). If UE ascertains that the size of time information field can express the current time stamp information at step 535, it logs the time stamp information in the time information field (540). On the contrary, if UE ascertains that the size of time information field cannot express the current time stamp information at step 535, it resets the latest time stamp information or the time stamp value and records information from 1 (545). UE logs the last collected MDT measurement in one sample (550). UE determines whether the measurement duration has elapsed (555). If the measurement duration has elapsed at step 555, UE stops the MDT measurement. On the contrary, if the measurement duration has not elapsed at step 555, UE waits for the next sampling cycling and returns to step 515.

Embodiment 2

The embodiment is implemented in such a way that the time stamp unit is fixed and the size of time information field is set to be variable according to the measurement duration. The time stamp unit is set to a certain value. It is preferable that the time stamp unit is identical to the sampling cycle. The value of the time information field varies the measurement duration configured by eNB. In that case, UE can receive correctly the time information field from the eNB. Alternatively, UE can calculate the time information field based on the measurement duration and the time stamp unit. The size of the time information field is calculated by the following equation 1.

$$\text{Ceiling}\{\log 2(\text{measurement duration/time stamp unit})\}$$

For example, if it is assumed that the time stamp unit is a sampling cycle, the time information field needs the size as follows.

Sampling cycle is 5.12 s and the measurement duration is 3600 seconds, relative time field size is 10 bits Sampling cycle is 10.24 s and the measurement duration is 2400 seconds, relative time field size is 8 bits  Equation 1

The size of time information field can be calculated in eNB or UE. This is because the time stamp unit is a value that can be set according to a certain assumption and the measurement duration is a value that eNB provided to UE. Therefore, UE and eNB can have information for calculating the size of time information field. Thus, eNB can calculate the size of time information field and inform UE of it. Alternatively, UE can calculate the size of time information field via corresponding information transmitted from eNB.

Figure 6:
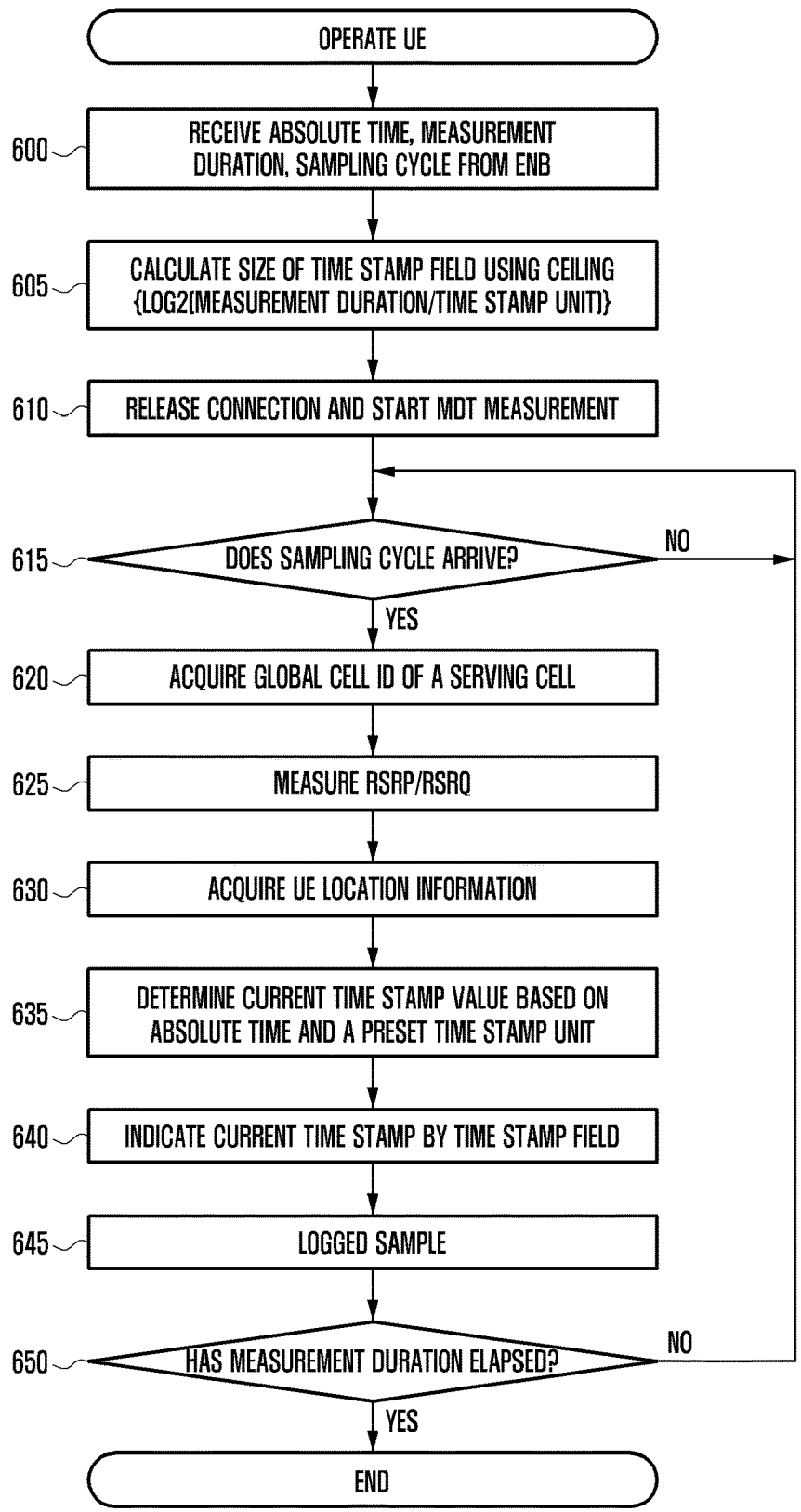
FIG. 6 illustrates a flow chart describing a method for operating UE in embodiment 2 of the invention.

FIG. 6 illustrates a flow chart describing a method for operating UE in embodiment 2 of the invention.

UE receives echoed absolute time, measurement duration, and sampling cycle from eNB via MDT configuration information (600). UE determines the size of the time information field by using the measurement duration and the time stamp unit (605). It is preferable that the time stamp unit is identical to the sampling cycle. In that case, UE can determine the size of time information field via equation 1.

Although the embodiment is implemented in such a way that UE calculates the size of time information field, it can be modified in such a way that eNB calculates the size of time information field and provides it to the UE.

UE switches the current mode to an idle mode and performs MDT measurement (610). UE determines whether the sampling cycle arrives (615). If a time point arrives to log the measurement result at step 615, UE collects information items to be logged in samples via the following steps 620 to 635. Since steps 620 to 635 are identical to steps 515 to 525 in FIG. 5, the detailed description is omitted. If the MDT measurements are logged according to a specific event, UE may directly perform step 620 without performing step 615. UE logs the time stamp information in the time information field (640), and the last collected MDT measurement in one sample (645). UE determines whether the measurement duration has elapsed (650). If the measurement duration has elapsed at step 650, UE stops the MDT measurement. On the contrary, if the measurement duration has not elapsed at step 650, UE waits for the next sampling cycling and returns to step 620.

Embodiment 3

The embodiment is implemented in such a way that the size of time information field is fixed and the time stamp unit is set to be variable according to the measurement duration. Since the size of time information field is fixed, the time stamp unit must be adjusted in order to express all time during the measurement duration. Since the time stamp unit varies according to the measurement duration, it cannot be set to be identical to the sampling cycle. If the size of time information field is set to a relatively small value, since the time stamp unit can express a relatively large span of time with respect to a large measurement duration, times cannot be expressed in detail by the difference. Therefore, the time information field is needed to be set with an appropriate size at the initial stage. The time stamp unit can be calculated based on the size of the time information field and the measurement duration via the following equation 2.

Time stamp unit=measurement duration/$2x$.

Where the symbol $x$ denotes the size of time information field(bits).     Equation 2

Figure 7:
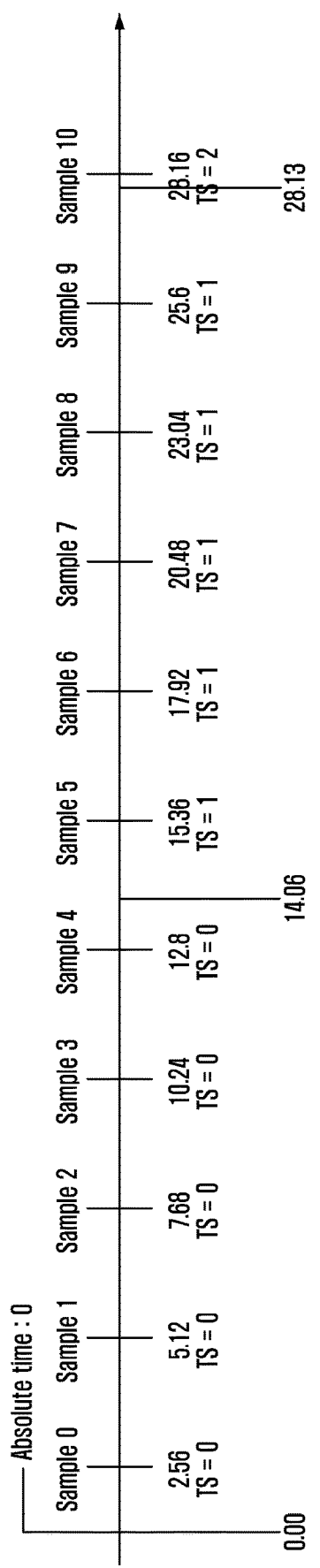
FIG. 7 illustrates a first view describing an operation of time information and time stamp unit calculated in embodiment 3.

For example, as shown in FIG. 7, when the size of time information field, x, is 8 bits; measurement duration is 3600 seconds; and sampling cycle is 2.56 seconds, the time stamp unit is 14.0625 seconds (=3600/2.56).

If a log time of the $6^{th}$ sample 700 is derived, it is the $2^{nd}$ sample at time stamp=1.

Therefore, Relative time={floor [(14.06/2.56), 1]+}*2.56=17.92 seconds.

Therefore, the log time of a sample can be derived via the following, generalized equation 3.

Relative time of the sample={floor(relative timing unit*Time stamp/sampling cycle)+ position}*sampling cycle     Equation 3

The time stamp unit can be calculated in eNB or UE. This is because enB provides the size of time information field and the measurement duration to the UE. Therefore, UE and eNB can have information for calculating the size of time information field. Thus, eNB can calculate the size of time information field and inform UE of it. Alternatively, UE can calculate the size of time information field via corresponding information transmitted from eNB.

In order to easily calculate a sample log time, the time stamp unit can be expressed as the multiples of a sampling cycle. That is, the time stamp unit can be determined as the following equation 4.

Time stamp unit=Ceiling(measurement duration/sampling cycle)/$2x$     Equation 4

Log time of a sample can be calculated as the following equation 5.

Relative time of the sample=(time stamp*relative time unit+position)*sampling cycle     Equation 5

Figure 8:
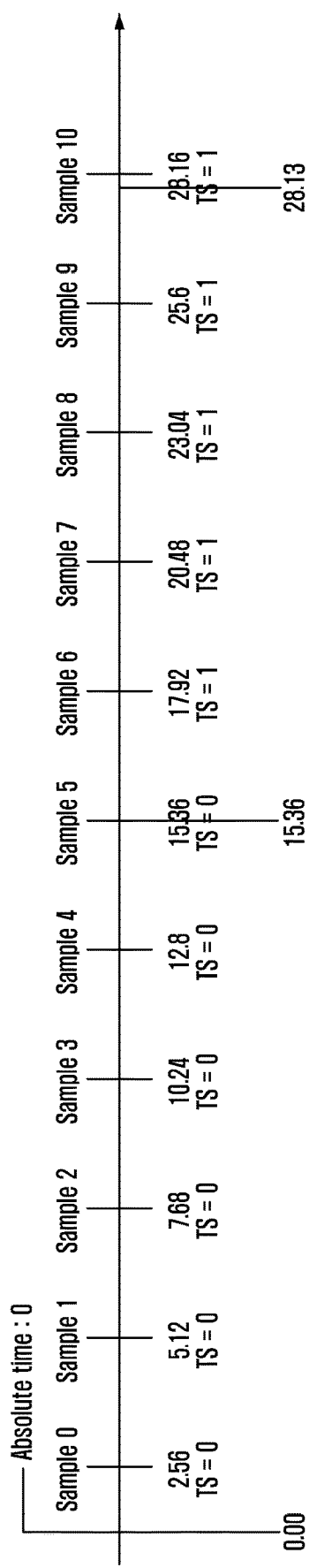
FIG. 8 illustrates a second view describing an operation of time information and time stamp unit calculated in embodiment 3.

For example, as shown in FIG. 8, when the size of time information field, x, is 8 bits; measurement duration is 3600 seconds; and sampling cycle is 2.56 seconds, time stamp unit=Ceiling (3600/2.56)/256=6 sampling cycles.

If a log time of the 6th sample 800 is derived, it is the $1^{st}$ sample at time stamp=1.

Therefore, Relative time=[6*1+1]*2.56=17.92 seconds.

Figure 9:
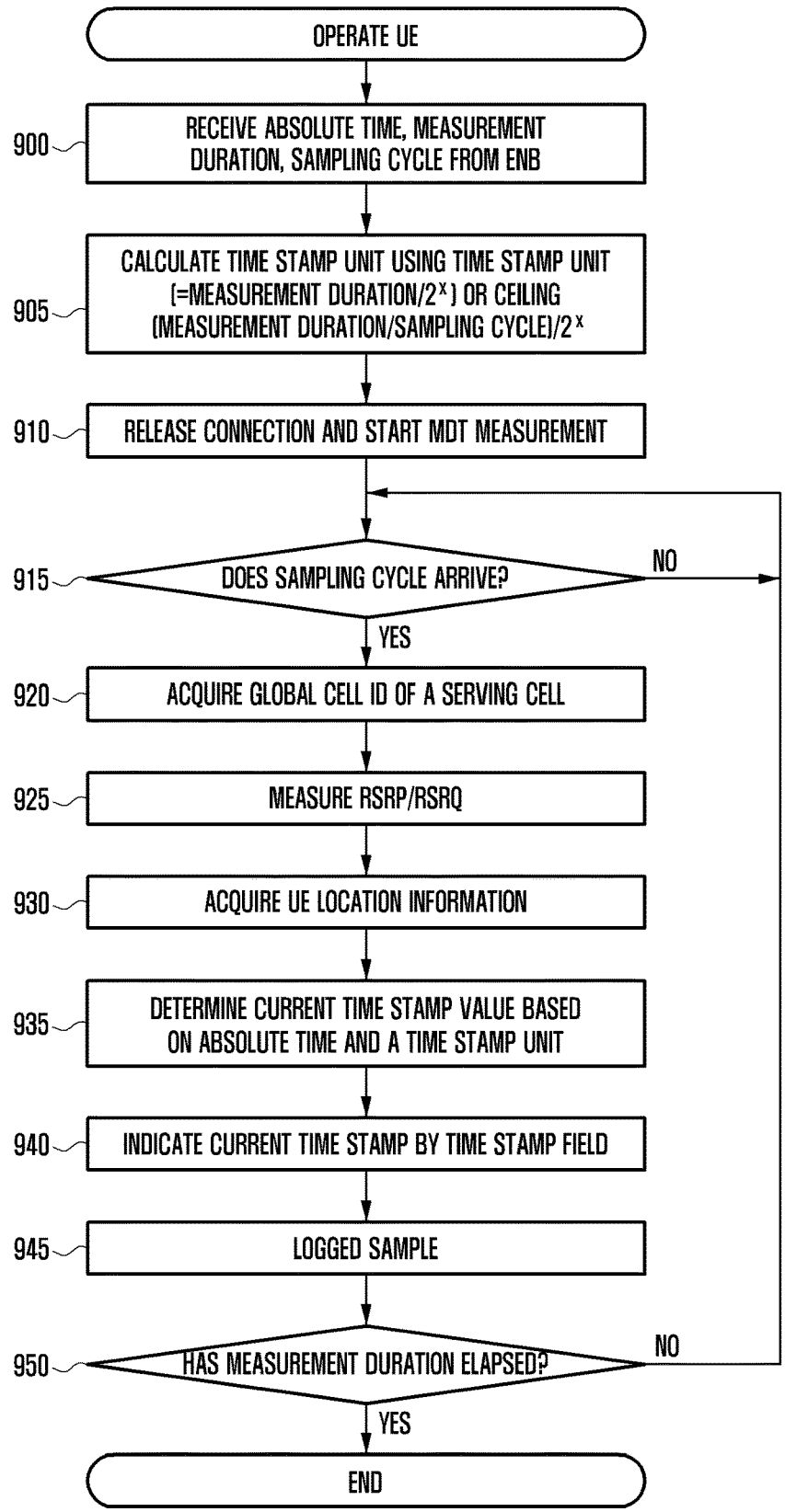
FIG. 9 illustrates a flow chart describing a method for operating UE in embodiment 3 of the invention.

FIG. 9 illustrates a flow chart describing a method for operating UE in embodiment 3 of the invention.

UE receives echoed absolute time, measurement duration, and sampling cycle from eNB via MDT configuration information (900). UE determines the time stamp unit, via equation 2, by using the measurement duration and the size of the time information field (905). It is preferable that the size of time information field is fixed and the UE and eNB have already known the size.

Although the embodiment is implemented in such a way that UE calculates the time stamp unit, it can be modified in such a way that eNB calculates the time stamp unit and provides it to the UE.

UE switches the current mode to an idle mode and performs MDT measurement (910). UE determines whether the sampling cycle arrives (915). If a time point arrives to log the measurement result at step 915, UE collects information items to be logged in samples via the following steps 920 to 935. Since steps 920 to 935 are identical to steps 515 to 525 in FIG. 5, the detailed description is omitted. If the MDT measurements are logged according to a specific event, UE may directly perform step 920 without performing step 915.

UE logs the time stamp information in the time information field (940), and the last collected MDT measurement in one sample (945). UE determines whether the measurement duration has elapsed (950). If the measurement duration has elapsed at step 950, UE stops the MDT measurement. On the contrary, if the measurement duration has not elapsed at step 950, UE waits for the next sampling cycling and returns to step 920.

Embodiment 4

In order to reduce overhead in the time information field, if an event occurs where the time difference between samples isn't a sampling cycle, the time stamp values are inserted into samples instead of adding time stamps to all samples. This is because time can be predicted based on the previously received samples as long as the sampling cycle has been known. However, embodiment 4 can be applied to only periodic pilot measurements logging MDT measurements at each sampling cycle, and the time stamp value must be applied to the event-triggered log.

Figure 10:
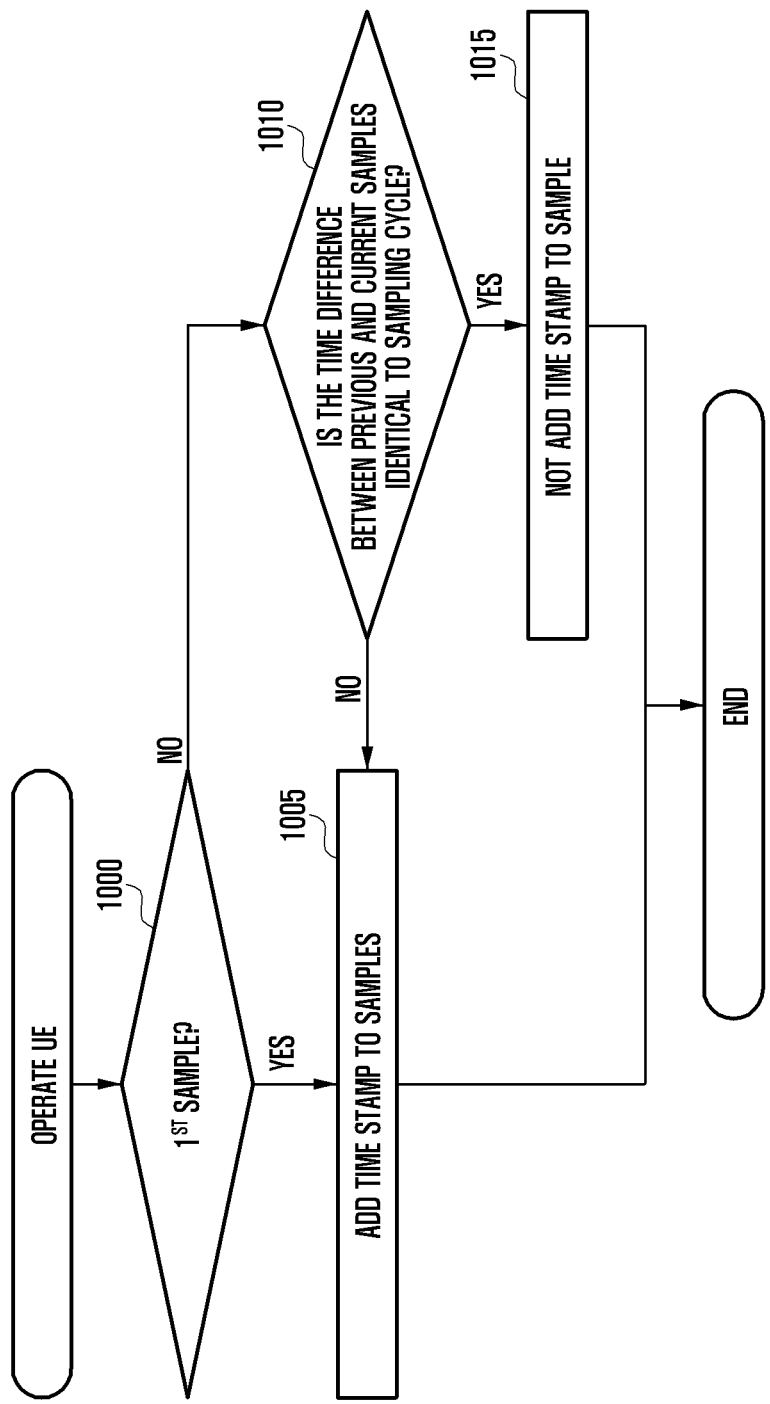
FIG. 10 illustrates a flow chart describing a method for operating UE in embodiment 4 of the invention.

FIG. 10 illustrates a flow chart describing a method for operating UE in embodiment 4 of the invention.

UE determines whether the log sample is the first sample after MDT is configured (1000). If UE ascertains that the log sample is the first sample at step 1000, it attaches a time stamp to the sample (1005). On the contrary, if UE ascertains that the log sample isn't the first sample at step 1000, it determines whether the time difference between the previous sample and the current sample is identical to the sampling cycle (1010). If UE ascertains that the time difference between the previous sample and the current sample isn't identical to the sampling cycle at step 1010, it attaches a time stamp to the current sample at step 1005. On the contrary, if UE ascertains that the time difference between the previous sample and the current sample is identical to the sampling cycle at step 1010, it doesn't attach a time stamp to the current sample (1015).

Figure 11:
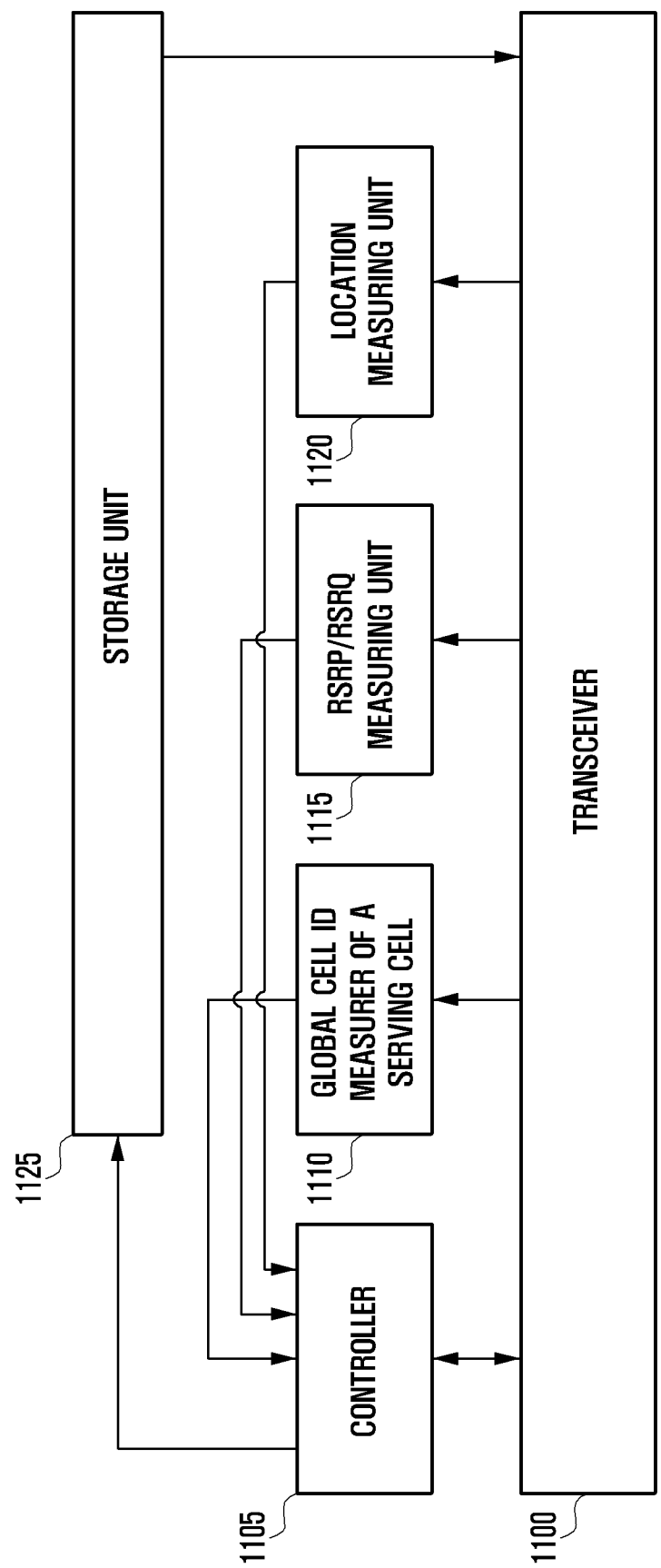
FIG. 11 illustrates a schematic block diagram showing UE according to an embodiment of the invention.

FIG. 11 illustrates a schematic block diagram showing UE according to an embodiment of the invention. UE collects a global cell ID of a serving cell, RSRP/RSRQ, and location information via measuring units 1110, 1115 and 1120, respectively, from signals via a transceiver 1100. If UE is equipped with a receiver for receiving satellite signals such as GPS signals, the location measuring unit 1120 collects location information from the received satellite signals. On the contrary, if UE isn't equipped with a satellite signal receiver, it collects information, e.g., physical cell ID and RSRP/RSRQ of the adjacent cells, thereby predicting the location information. If the collected information is transferred to the controller 1105, the controller 1105 controls the measuring units, calculates time stamps, and configures the final sample. The controller 1105 receives corresponding information from eNB via the transceiver 1100, in order to log time stamp values.

The controller 1105 configures time stamps, according to the sizes of time information field and time stamp units that are have variable or fixed values, and performs control operations to log the measured wireless channel information according to the configured time stamps.

In embodiment 1 as described above, the controller 1105 determines, if the time stamp unit and the size of time information field are fixed, whether the current time stamp information can be expressed with the size of time information field. If the current time stamp information can be expressed with the size of time information field, the controller 1105 logs the time stamp information in the time information field. On the contrary, if the current time stamp information cannot be expressed with the size of time information field, the controller 1105 resets the latest time stamp information.

In embodiment 2 as described above, the controller 1105 determines, if the time stamp unit is fixed and the size of time information field is variable, the size of time information field, based on the measurement duration transmitted from eNB and the determined time stamp unit. In particular, the controller 1105 determines the size of time information field via equation 1.

In embodiment 3 as described above, the controller 1105 determines, if the time stamp unit is variable and the size of time information field is fixed, the time stamp unit, based on the measurement duration transmitted from eNB and the determined size of time information field. In particular, the controller 1105 determines the time stamp unit via equation 2.

In embodiment 4 as described above, the controller 1105 inserts time stamp information into samples if the time difference between one or more samples where wireless channel information is logged doesn't match the sampling cycle.

Samples logging MDT measurements and time stamps are stored in a buffer (storage unit) 1125 of UE. When UE operates in a connected mode, UE informs eNB that UE has stored MDT measurements. eNB requests the report of MDT measurements from the UE if necessary. If UE receives the request, the controller 1105 controls the buffer and transmits the stored MDT measurements to the eNB.

As described above, the UE according to the invention can effectively report MDT measurements to a serving base station.

What is claimed is:

1. A method for transmitting a message by a terminal in a wireless communication system, the method comprising:
   receiving, from a first base station, measurement configuration message including absolute time information associated with the first base station, logging interval information, and logging duration information;
   logging measurement information periodically based on the logging interval information until a timer identified based on the logging duration information expires, while the terminal is in a radio resource control (RRC) idle mode;
   receiving, from a second base station, a report request message indicating a request of logged measurement information, while the terminal is in a RRC connected mode after transitioning from the RRC idle mode to the RRC connected mode; and
   transmitting, to the second base station, a measurement report message in response to the report request message, the measurement report message including the absolute time information associated with the first base station and a list of logged measurement information including at least one periodically logged measurement information,
   wherein each of the at least one periodically logged measurement information includes relative time stamp, location information, cell identity information,
   reference signal received power (RSRP) information and reference signal received quality (RSRQ) information,
   wherein the relative time stamp indicates a time of logging measurement result and is measured relative to the absolute time information, and
   wherein the relative time stamp includes fixed size bits indicating a value in seconds.

2. The method of claim 1, wherein the logging duration information is indicated by fixed size bits.

3. The method of claim 1, wherein the logging duration information is independent of state changes.

4. A terminal in a wireless communication system, the terminal comprising:
   a transceiver configured to transmit and receive a signal; and
   a controller configured to:
      receive, from a first base station, measurement configuration message including absolute time information associated with the first base station, logging interval information, and logging duration information,
      log measurement information periodically based on the logging interval information until a timer identified based on the logging duration information expires, while the terminal is in a radio resource control (RRC) idle mode,
      receive, from a second base station, a report request message indicating a request of logged measurement information, while the terminal is in a RRC connected mode after transitioning from the RRC idle mode to the RRC connected mode, and
      transmit, to the second base station, a measurement report message in response to the report request message, the measurement report message including the absolute time information associated with the first base station and a list of logged measurement information including at least one periodically logged measurement information,
   wherein each of the at least one periodically logged measurement information includes relative time stamp, location information, cell identity information, reference signal received power (RSRP) information and reference signal received quality (RSRQ) information, wherein the relative time stamp indicates a time of logging measurement result and is measured relative to the absolute time information, and wherein the relative time stamp includes fixed size bits indicating a value in seconds.

5. The terminal of claim 4, wherein the logging duration information is indicated by fixed size bits.

6. The terminal of claim 4, wherein the logging duration information is independent of state changes.

7. A method for receiving a message by a first base station in a wireless communication system, comprising:
 setting measurement configuration message including absolute time information associated with the first base station, logging interval information, and logging duration information; and
 transmitting, to a terminal, the measurement configuration message,
 wherein the measurement information is logged periodically based on the logging interval information until a timer identified based on the logging duration information expires, while the terminal is in a radio resource control (RRC) idle mode,
 wherein a report request message indicating a request of logged measurement information is transmitted, from a second base station to the terminal, while the terminal is in a RRC connected mode after transitioning from the RRC idle mode to the RRC connected mode,
 wherein a measurement report message is transmitted, from the terminal to the second base station, in response to the report request message, the measurement report message including the absolute time information associated with the first base station and a list of logged measurement information including at least one periodically logged measurement information, wherein each of the at least one periodically logged measurement information includes relative time stamp, location information, cell identity information, reference signal received power (RSRP) information and reference signal received quality (RSRQ) information,
 wherein the relative time stamp indicates a time of logging measurement result and is measured relative to the absolute time information, and
 wherein the relative time stamp includes fixed size bits indicating a value in seconds.

8. The method of claim 7, wherein the logging duration information is indicated by fixed size bits.

9. A first base station in a wireless communication system, the first base station comprising:
 a transceiver configured to transmit and receive a signal; and
 a controller configured to:
  set measurement configuration message including absolute time information associated with the first base station, logging interval information, and logging duration information, and
  transmit, to a terminal, the measurement configuration message,
 wherein the measurement information is logged, by the terminal, periodically based on the logging interval information until a timer identified based on the logging duration information expires, while the terminal is in a radio resource control (RRC) idle mode,
 wherein a report request message indicating a request of logged measurement information is transmitted, from a second base station to the terminal, while the terminal is in a RRC connected mode after transitioning from the RRC idle mode to the RRC connected mode,
 wherein a measurement report message is transmitted, from the terminal to the second base station, in response to the report request message, the measurement report message including the absolute time information associated with the first base station and a list of logged measurement information including at least one periodically logged measurement information, wherein each of the at least one periodically logged measurement information includes relative time stamp, location information, cell identity information, reference signal received power (RSRP) information and reference signal received quality (RSRQ) information,
 wherein the relative time stamp indicates a time of logging measurement result and is measured relative to the absolute time information, and
 wherein the relative time stamp includes fixed size bits indicating a value in seconds.

10. The first base station of claim 9, wherein the logging duration information is indicated by fixed size bits.

* * * * *